United States Patent
Booth (10) Patent No.: US 6,643,707 B1
(45) Date of Patent: Nov. 4, 2003

(54) METHOD AND APPARATUS FOR DEFINING, MANAGING AND DISTRIBUTING BROADCAST NAMES

(75) Inventor: Robert C. Booth, Jamison, PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/503,666

(22) Filed: Feb. 14, 2000

(51) Int. Cl.[7] .............................................. G06F 15/16
(52) U.S. Cl. ...................... 709/245; 709/201; 709/230; 709/203
(58) Field of Search ................................ 709/201, 226, 709/238, 245, 246, 203, 230; 707/3, 10, 104; 370/352, 390, 392, 397, 409

(56) References Cited

U.S. PATENT DOCUMENTS

| | | | |
|---|---|---|---|
| 5,958,052 A | * 9/1999 | Bellovin et al. | ............ 713/201 |
| 5,977,969 A | * 11/1999 | DiAngelo | .................... 345/780 |
| 6,119,171 A | * 9/2000 | Alkhatib | ..................... 709/245 |
| 6,298,341 B1 | * 10/2001 | Mann et al. | .................... 707/3 |
| 6,381,627 B1 | * 4/2002 | Kwan et al. | ................. 709/201 |
| 6,466,570 B1 | * 10/2002 | Low et al. | ................... 370/352 |

FOREIGN PATENT DOCUMENTS

EP          0 844 766          5/1998

OTHER PUBLICATIONS

D. Zigmond et al, "Uniform Resource Identifiers for Television Broadcasts," Network Woring Group, RFC 2838, May 2000.*

Spamer, Martin, "Re: DNS and some of my ideas", XP–002173856, Oct. 11, 1999, pp. 1–3.

A. Tanenbaum, "Computer Networks", $3^{rd}$ ed., Prentice Hall PTR, 1996, pp. 622–630.

P. Mockapetris, "Domain Names—Concepts and Facilities", Request for Comments: 1034, Nov. 1987.

P. Mockapetris, "Domain Names—Implementation and Specification", Request for Comments: 1035, Nov. 1987.

* cited by examiner

*Primary Examiner*—Mehmet B. Geckil
(74) *Attorney, Agent, or Firm*—Barry R. Lipsitz; Douglas M. McAllister (57) ABSTRACT

The Domain Name System (DNS), which has been used for mapping names to Internet Protocol (IP) addresses, is adapted to a broadcast environment, such as a broadband cable or satellite television network. A number of master files are stored on a broadcast name server that define zones of domains in a domain name space, which may include a television-related domain, with sub-domains for different service providers (e.g., ABC, HBO), and a cable domain, with sub-domains for applications, administrative functions and operating system-functions, e.g., at a set-top terminal. The television sub-domains may have their own sub-domains. For example, "ABC" may have the sub-domains "NEWS", "WEATHER", and "SPORTS." The master files are used to form broadcast resource records, which include an identifier for broadcast services (e.g., "ABC") or other data sources, and which are transmitted to end user terminal devices periodically, or in response to a query. The identifier identifies, e.g., an Internet Protocol address, a name, or a virtual channel that are associated with a broadcast or interactive service.

49 Claims, 5 Drawing Sheets

METHOD AND APPARATUS FOR DEFINING, MANAGING AND DISTRIBUTING BROADCAST NAMES

BACKGROUND OF THE INVENTION

The present invention relates to a system for adapting the Domain Name System (DNS), which has been used for mapping names to Internet Protocol (IP) addresses, to a broadcast environment, such as in a broadband cable or satellite television network. The invention enables the integration of Internet-type resources in the broadcast environment.

The DNS, as used in the environment of computer networks such as the Internet, is a tool for mapping domain names, which are short alphabetical names, to an IP address. For example, the domain name "www.gi.com" may be mapped to an IP address such as "196.0.5.93". The DNS provides a hierarchical domain-based naming scheme and a distributed database system for implementing the naming scheme.

In practice, an application program, such as a web browser, calls a library procedure known as a resolver, and passes the domain name to it. The resolver sends a data packet to a local DNS server, which looks up the name and returns the IP address to the resolver. The resolver provides the IP address to the application, which can use it to establish a connection with the computer represented by the domain name, such as a server.

A background discussion of the DNS can be found in A. Tanenbaum, *Computer Networks*, 3 rd ed., Prentice Hall PTR, 1996, pages 622–630.

However, with the-present desire to integrate Internet-type resources in the broadcast environment, it would be desirable to provide a system for resolving domain names in the broadcast environment. In particular, there is a need to provide a system that implements a broadcast domain space providing domain names for television resources, such as television programs, audio services, and Internet-type resources, such as web pages.

A system is needed that allows a server, or a set of servers, to specify the location of content and services within a broadcast using the domain name syntax. In addition, the system should allow client applications, such as a web browser, to locate any information that is part of a broadcast through the means of a domain name. Further, the system should allow defined broadcast domain names to be used within a Uniform Resource Locator (URL) to specify the location of broadcast content and services.

The system should be suitable for use in a digital video environment. Additionally, the system should be suitable for use with virtually any type of broadcast or interactive network, including a satellite network and a cable television network.

The system should organize the domain names in a domain name space, and provide information to network users in the form of a broadcast DNS message having a broadcast resource record that identifies a data source that is associated with a respective domain, where the data source can be a broadcast programming service, such as TV program, or other data, for example.

The broadcast resource records should be provided to the users in a non-interactive manner though periodic transmissions, or in an interactive manner, in response to a resolver query to a name server.

The system should allow different servers to manage different portions or zones of the domain name space.

The present invention provides a system having the above and other advantages.

SUMMARY OF THE INVENTION

The present invention relates to a system for adapting the Domain Name System (DNS), which has been used for mapping names to Internet Protocol (IP) addresses, to a broadcast environment, such as in a broadband cable or satellite television network.

A method for providing a broadcast domain name system includes the step of providing at least one master file at a broadcast domain name server to define at least one node within a broadcast domain name space. The node is provided in an associated zone of, and corresponds to, a domain within the broadcast domain name space, and the domain has an associated domain name. The master file is used to form a broadcast resource record that designates at least one attribute of the node. Subsequently, a message comprising the broadcast resource record is transmitted from the broadcast domain name server to a resolver to enable a user of the broadcast domain name system to resolve the domain name.

The domain name space may include a television-related domain, with sub-domains for different service providers (e.g., ABC, HBO), and a cable domain, with sub-domains for applications, administrative functions and operating system functions, e.g., at a set-top terminal. The television sub-domains may have their own sub-domains. For example, "ABC" may have the sub-domains "NEWS", "WEATHER", "SPORTS" and so forth. The master files include broadcast resource records (BRRs) that identify the broadcast programming sources (e.g., "ABC").

When a query for a broadcast domain name is received from a-user program, e.g., from a user application of the set-top box, the corresponding BRR information is returned to the user program via a client resolver function. The corresponding BRR information identifies, e.g., an Internet Protocol address, a name, or a virtual channel that are associated with a data source that contains a service, e.g., a broadcast video programming service. Specifically, the BRRs are carried in a broadcast DNS message that is transmitted to a client resolver that a user program can access.

The broadcast resource records may be provided to a client resolver in a non-interactive manner, such as by periodic transmissions (e.g., carouseling, or some other predetermined scheduling) of the BDNS messages.

Alternatively, the broadcast resource records may be provided to a client resolver in a interactive manner, such as occurs with traditional DNS resource records.

A corresponding method for use at a resolver is also presented.

Corresponding apparatuses are also presented.

DETAILED DESCRIPTION OF THE INVENTION

The present-invention relates to a system for adapting the Domain Name System (DNS), which has been used for mapping names to Internet Protocol (IP) addresses, to a broadcast environment, such as in a broadband cable or satellite television network.

1. Scope

The present invention describes various options for implementing a broadcast domain name system (BDNS) in broadband environments. Section 2 provides background information on how the Domain Name System (DNS) is currently used within the framework of the Internet. Section 3 describes specific configurations of the Broadcast Domain Name System (BDNS) of the present invention.

The BDNS design is intended to be an open and generic mechanism allowing applications to resolve domain names within a broadcast environment. To achieve this goal, the design outlines methods for defining broadcast domain names, and authorities for those domains. An "authority" refers to the entity that manages authoritative resource records, which are the records for each domain. The BDNS design is also intended to provide support for Advanced Television Enhancement Forum Specification (ATVEF)-compliant applications.

2. Overview

The BDNS of the invention provides applications with the capability to resolve domain names within broadcast environments. Since a web browser is one of the most widely used applications that uses the traditional DNS, we briefly review how such an application accesses the DNS.

The current syntax and usage of Uniform Resource Locators (URLs), and the resolving of domain names into IP addresses, is described below.

2.1 URL Syntax

An overview and decomposition of the URL syntax is helpful in understanding the BDNS messages of the invention that are defined later in this document. A URL typically consists of three main elements: a protocol, a host (or server), and an absolute path, i.e.:

protocol://host/path

Any resource request, for example via a File Transfer Protocol (FTP) or a web browser HyperText Transfer Protocol (HTTP) request, requires resolving the location of the host where the resource resides. This is needed to establish a connection between the machine (or local host) that is making the request and the host machine where the resource resides. A web browser request, such as "http://www.gi.com/index.html" results initially in a DNS lookup to resolve the IP address of the host (www.gi.com). In this case, once resolving the IP address, an IP connection is established with the host, and the application sends the HTTP request for the resource, including the path element.

Another example is the request of a resource that resides on the local machine from which the request is being generated, e.g., "file:///mydir/myfile.txt". There are three slashes after "file:". Between the second and third slash, typically is a host domain name that needs resolving. However, since the resource. requested is on the local host, no host resolution needs to occur. Thus, a "connection" to the local host is intrinsic.

2.2 Domain Name System

The existing architecture of the DNS is most widely used within the Internet for resolving a domain name, represented by text, into a location (e.g.—an IP address) of a remote host.

The host (or domain name) element within a URL reveals a syntax-that consists of a series of domain labels. The domain labels within a URL are presented lowest level domain first and highest level domain last, and are separated by periods. The Domain System follows a hierarchical tree structure consisting of node and leaf domains. At the very top of the tree structure resides a single node called the root domain. The root domain does not have a corresponding domain label. Just below the root domain resides what are considered the top-level domains, such as 'com', 'net', and 'org'. Nodes and leafs are alike in that they both specify domains within the system and are treated accordingly throughout the system.

DNS messages are described in further detail in section 2.2.1. Name Servers answer queries from resolvers by reading information from master files (authoritative resource records) that are stored and maintained on the name server's local file system. A Name Server's master files will contain information defining the zones for which it has authority. There are several configurations for Name Servers depending upon required capabilities. Refer to RFC 1034 and RFC 1035 for additional discussion relating to the various standard configurations and usage of Name Servers.

In addition to the DNS messages described in section 2.2.1, section 2.2.2 describes the Question section within DNS messages, section 2.2.3 describes Resource Records (RR), section 2.2.4 discusses Domain Names, and an overview of master files is provided in section 2.2.5.

2.2.1 Domain Name System Message

The domain name system resolves domain names using a query/response style message protocol. Name server accesses on the Internet are supported by Transmission Control Protocol (TCP) on port 53 and by User Datagram Protocol (UDP) on port 53. Table 1 shows the fields that are provided in standard DNS messages.

TABLE 1

| DNS message | Description |
| --- | --- |
| Identification | An unsigned integer used by clients to match up responses with queries. |
| Operation | A value indicating that this message is either a query or a response to a query. |
| Query_type | An enumerated type field that indicates the query type being delivered in this DNS_message. Query_type is set by the originator of a query message and copied in a response message. The following are valid query types: standard, inverse, completion1, completion2 |

TABLE 1-continued

| DNS message | Description |
| --- | --- |
| Answer_authoritative | Indicates whether or not the answer section is authoritative. |
| Message_truncated | Indicates that this message is truncated. |
| Recursion_desired | Indicates that recursion is desired. |
| Recursion_available | Indicates that recursion is available. |
| Response_type | An enumerated type field that indicates the response type being delivered in this DNS_message. The following are valid response types: no error, format error in query, server failure, name does not exist |
| Number_of_questions | A value indicating the number of question sections that follow in this DNS message |
| Number_of_answers | A value indicating the number of answer sections that follow in this DNS message |
| Number_of_authority | A value indicating the number of authority sections that follow in this DNS message |
| Number_of_additional | A value indicating the number of additional information sections that follow in this DNS message |
| For (i=0; i<number_of_questions; i++) { | |
| Question_section | Includes a domain name question |
| } | |
| For (i=0; i<number_of_answers; i++) { | |
| Answer_section | Includes an answer resource record |
| } | |
| For (1=0; i<number_of_authority) { | |
| Authority_section | Includes an authority resource record |
| } | |
| For (i=0; i<number_of_additional) { | |
| Additional_info_section | Includes an additional information resource record |
| } | |

2.2.2 Question Section

Table 2 describes the fields within a DNS message question section:

TABLE 2

| Question Section | Description |
| --- | --- |
| Query_domain_name | A domain name as defined in section 2.2.4 that corresponds to this query. |
| Query_type | A value specifying the type of this query. For example, 'A' represents an Internet address type and 'SOA' represents a start of authority type. |
| Query_class | A value specifying the class of this query. For example, 'IN' represents the Internet class. |

2.2.3 Response Sections/Resource Records

The answer_section, authority_section and additional_info_section fields within a DNS_message (see Table 1) all use the same format referred to as a "resource record". The elements within a resource record are described in Table 3.

TABLE 3

| Resource Record | Description |
| --- | --- |
| Resource_domain_name | A domain name as defined in section 2.2.4 that corresponds to this resource record. |
| Type | A value specifying the type of this resource record. For example, 'A' represents an Internet address type and 'SOA' represents a start of authority type. |
| Class | A value specifying the class of this resource. For example, 'IN' represents the Internet class. |
| Time_to_live | A value (TTL) specifying the number of seconds that this resource record can be cached in a client. |
| Resource_data_length | A value (RLENGTH) specifying the length in bytes of the resource data that follows in this message |
| Resource_data | The resource data (RDATA) associated with this resource record |

2.2.4 Domain Name

Domain names are represented as a sequence of labels. Each label within a domain name is defined as an 8-bit length field followed by a series of octets (one byte values) specifying the label name. A compression method is used to minimize data transmitted in DNS messages. This scheme uses a pointer mechanism to minimize repetitive domain names within a single message. Table 4 describes the fields describing a domain name.

TABLE 4

| Domain Name | Description |
| --- | --- |
| For (i=0; i<N; i++) { | N represents the number of labels within this domain name. |
| Length_field | A value that specifies the length in bytes of this domain name. |
| Label_control | A field that indicates if the data that follows is a label or a pointer. |
| if ( Label_control == label) { | |
| Label_length | A value specifying the length of the label name that follows in this message |
| Label | A case-insensitive label that must start and end with letters and where each byte can be one of ten digits '0' through '9', upper case letters 'A' through 'Z', lower case letters 'a' through 'z', or a hyphen '-'. |
| } | |

TABLE 4-continued

| Domain Name | Description |
|---|---|
| if ( Label_control == pointer) { | |
| Offset | A value indicating the offset (in bytes) from the start of the message where a previous instance of the same name can be found. |
| } | |
| End_of_name | A value always equal to zero that indicates the end of a domain name. |
| } | |

2.2.5 Master Files

Master files are used by name servers to define zones within domains. Name servers obtain information about zones by reading master files and answering foreign resolver queries about the zones. Master files contain lists of resource records in text form. The format of master files is that of a sequence of entries, which are line-oriented and take one of the following forms:

<blank> [<comment>]
$ORIGIN <domain-name> [<comment>]
$INCLUDE <file-name> [<domain-name>] [<comment>]
<domain-name> <rr> [<comment>]
<blank> <rr> [<comment>]

Resource Records <rr> contents have the following forms:

[<TTL>] [<class>] <type> <RDATA>
[<class>] [<TTL>] <type> <RDATA>

In addition, parentheses "( )" can be used to extend resource records across line boundaries.

An example master file representing the domain 'abc.xyz.com' might contain the following entries:

```
XYZ.COM. IN SOA SRI-NIC.ARPA. HOSTMASTER.SRI-NIC.ARPA. (
    870729 ;serial
    1800 ;refresh every 30 minutes
    300 ;retry every 5 minutes
    604800 ;expire after a week
    86400 ;minimum of a day
    )
NS SRI-NIC.ARPA
ABC.XYZ.COM. 172800 A 196.0.5.93
```

In the above example a DNS Internet address query of the domain name 'abc.xyz.com' results in a DNS response containing the IP address '196.0.5.93'.

3. Broadcast Domain Name System

The Broadcast Domain Name System (BDNS) of the present invention provides enhancements to the existing DNS architecture to allow broadcast domain names to be defined and utilized. To support these enhancements, both host Resolvers and Name Servers are required to provide support for a new set of Broadcast Resource Records (BRR).

Figure 1:
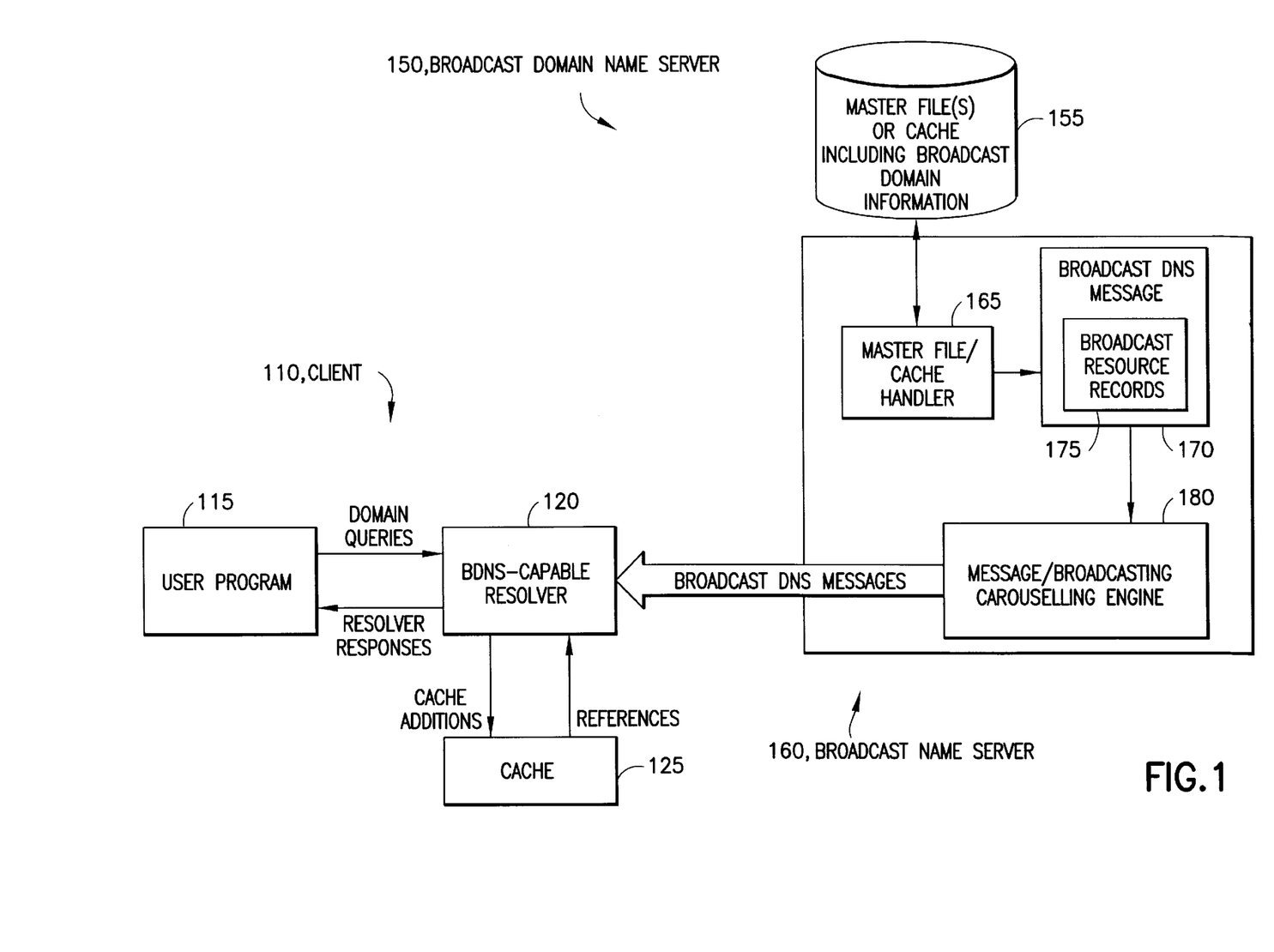
FIG. 1 illustrates a non-interactive Broadcast Domain Name System (BDNS) in accordance with the present invention.

FIG. 1 illustrates a non-interactive Broadcast Domain Name System (BDNS) in accordance with the present invention.

A client 110 and a Broadcast Domain Name Server (BDNS) are provided. The client 110 includes a user program 115, which may be an application program running on a set-top box, for example. The program may include a web browser, and interactive program guide function., or other function for playing games, home shopping or banking, and so forth. The user program 115 communicates with a BDNS capable resolver 120, which in turn communicates with a cache 125. The resolver 120 receives broadcast BDNS messages from a broadcast name server 160 of a broadcast domain-name server 150 in accordance with the present invention. The resolver 120 need only have a one-way, receive capability in this embodiment.

The client 110 can be any device that desires to resolve a name into an IP address/Source ID/Frequency/Broadcast IP address, etc., and can be located essentially anywhere, such as in a set-top box or a PC.

Here, the BDNS 150 is operating in a broadcast (transmit)-only environment by streaming/broadcasting predetermined (pre-canned) BDNS messages to the resolver 120. In practice, many resolvers/user terminals can receive the messages at the same time, such as in a subscriber television network.

The BDNS 150 includes a database or storage device 155 for storing master files that includes broadcast domain information. The device 155 may comprise master files and/or a cache, for example. This information is retrieved by a master file/cache handler 165 in the server 160, and processed to provide a broadcast DNS message 170, which includes one or more broadcast resource records 175. The BDNS message 170 is then provided to a message broadcasting/carouselling engine 180, which broadcasts the messages to the one or more resolvers including the resolver 120.

Generally, the messages can be broadcast periodically according to a predetermined schedule. Moreover, the messages may be broadcast in separate portions, in a piece meal manner. Any known transport scheme, such as packetized digital MPEG messages may be used.

Figure 2:
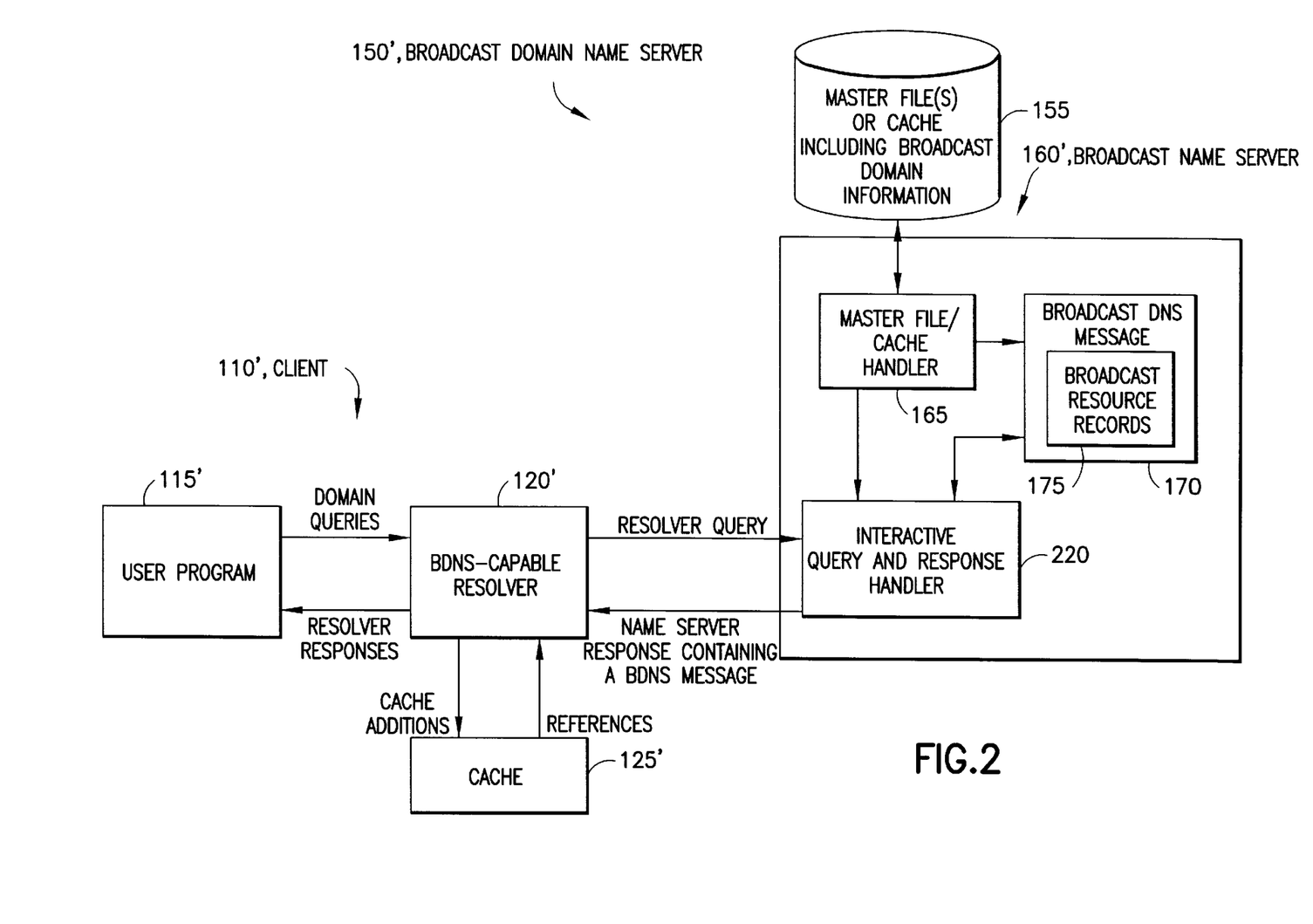
FIG. 2 illustrates an interactive Broadcast Domain Name System (BDNS) in accordance with the present invention.

FIG. 2 illustrates an interactive Broadcast Domain Name System (BDNS) in accordance with the present invention. Like-numbered elements, including those with prime or double prime superscripts, generally correspond to one another in the figures.

Here, a BDNS-capable resolver 120' provides a query to, and receives a corresponding BDNS response message from, an interactive query and response handler 220 of the Broadcast names server 160'.

The resolve 120' sends queries to the server 160 using the DNS message protocol.

In response to a domain query from the user program 115', the resolver 120' transmits a query to the server 160' to obtain the desired BDNS message as a response. The response is then provided to the user program 115' as a user response.

Optionally, the resolver 120' can store a number of broadcast resource records in its cache 125' or other memory for responding to domain queries to resolve domain names. If the requested information is not present locally at the resolver cache 125', only then is it necessary for the resolver 120' to send a request to the server 160' to obtain the requested information. For example, the resolver 120' can locally store broadcast resource records that are most commonly used by users in the network.

Figure 3:
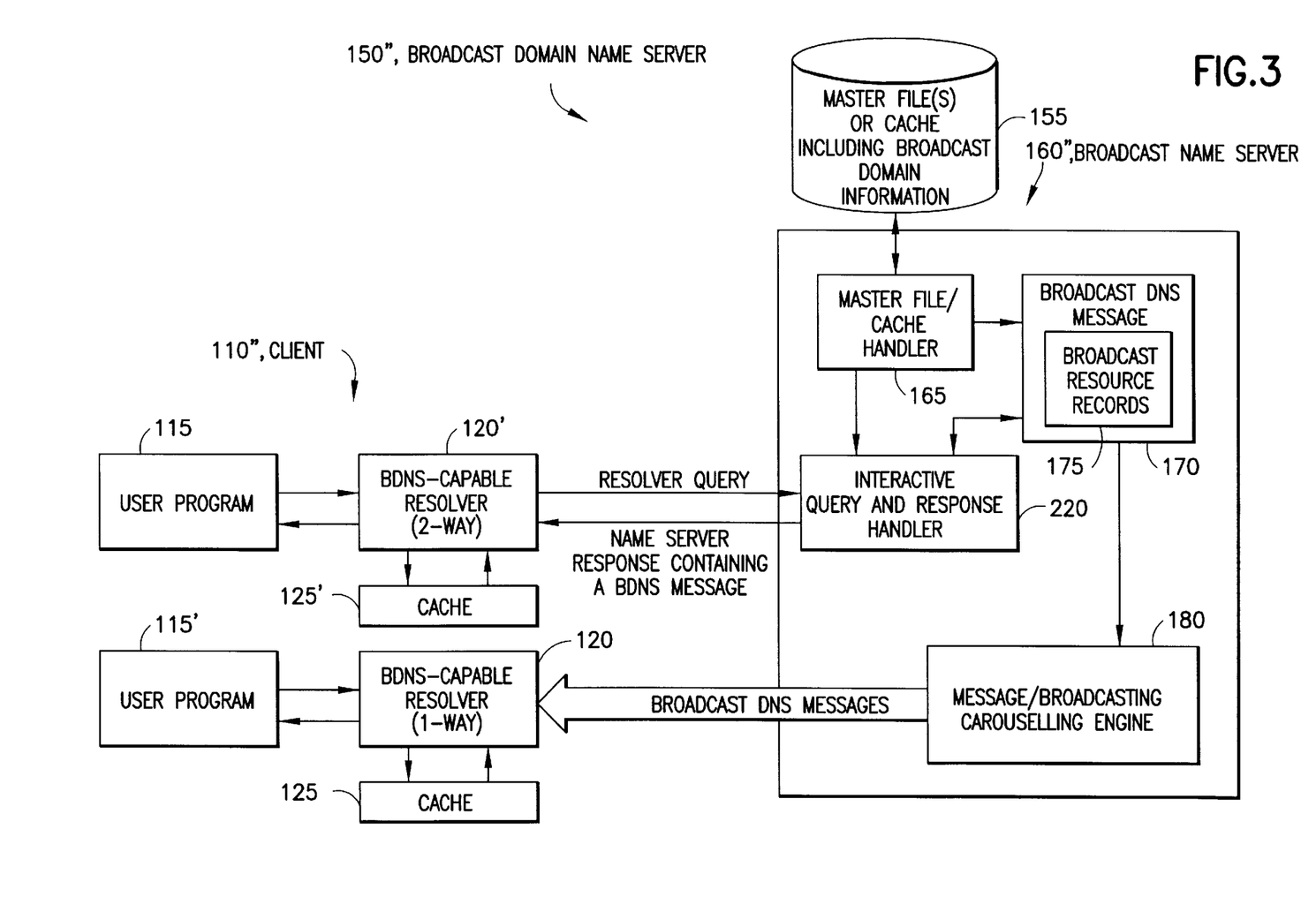
FIG. 3 illustrates a Broadcast Domain Name System (BDNS) with interactive and non-interactive modes in accordance with the present invention.

FIG. 3 illustrates a Broadcast Domain Name System (BDNS) with interactive and non-interactive modes in accordance with the present invention. Here, the combined broadcast name server 160 1" includes the functionality of both the non-interactive server 160 of FIG. 1, and the interactive server 160' of FIG. 2.

Thus, the BDNS may be provided as a separate entity from a traditional DNS name server, or the functionality of the two name servers can be incorporated into one name server supporting interactive queries and responses, as well as broadcast responses.

Moreover, the server 160" is shown communicating with two different resolvers, including the two-way capable (send/receive) resolver 120' of FIG. 2, and the one-way capable (receive only) resolver 120 of FIG. 1.

Thus, a single server 160" can service a number of resolvers (associated with set-top terminals or PCs, for example) in a network, where both one-way and two-way resolvers are provided.

Note that in any embodiment of the invention, the number of resolvers and broadcast name servers can be adjusted to service any number of users in a network, such as a subscriber television network. For example, it may be desired for many users to access a single resolver, e.g., at a headend, via their user programs. Or, each user may have its own local resolver. Moreover, the broadcast domain name server(s) may be located at the headend, or at some centralized upstream location that services many headends. Other variations will be apparent to those skilled in the art.

Figure 4:
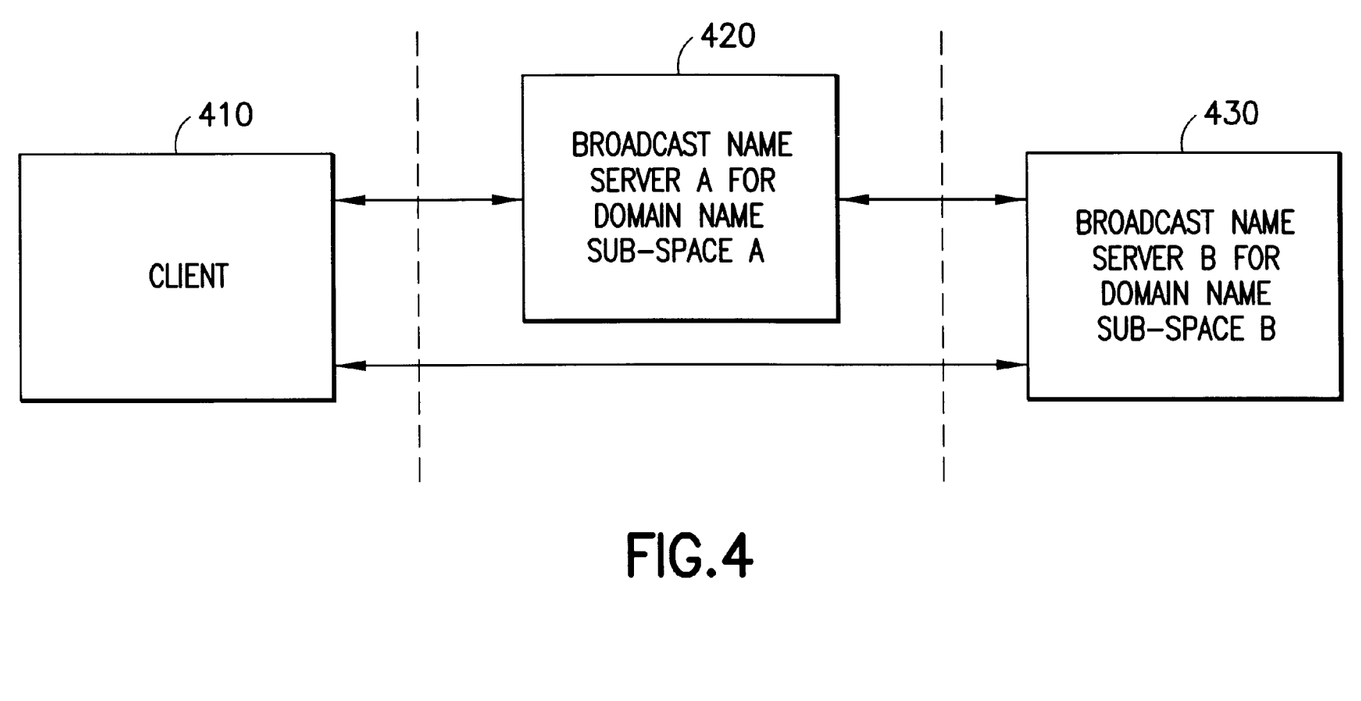
FIG. 4 illustrates chained Broadcast Domain Name System servers in accordance with the present invention.

FIG. 4 illustrates chained-Broadcast Domain Name System servers in accordance with the present invention.

Here, two broadcast name serves 420 and 430 are provided in a chained (serial) configuration, although additional servers may be provided in various configurations, including parallel paths, hub and spoke configurations, ring configurations, or any know network topology.

The purpose of server chaining is to divide up the responsibility for providing BDNS messages for the domain name space, and/or to provide redundancy.

In this example, a first "broadcast name server A" 420 is provided for a portion of a domain name space, termed "sub-space A", while a second "broadcast name server B" 430 is provided for another portion of a domain name space, termed "sub-space B". The subs-spaces can be disjoint, partially overlapping or fully redundant. The servers A 420 and B 430 can each broadcast messages to, and receive requests from, the client 410. Each server can be located in a physically remote location. For example, the server B 430 can be a centralized national location, while the server A 420 is at a headend of a local subscriber television network, or at a television content provider's premises (e.g. NBC), for example. In this case, a satellite. link may be appropriate for communications between the two servers 420 and 430. In addition, the BDNS may allow for the remapping of certain data source identifiers based upon broadcast plant, frequency, and/or channel map layouts.

Optionally, the servers may be associated with one another according to the content of the domain name space, the relative priority of the domain names to each-other, proprietary control of the domain name spaces, security access control considerations or other factors.

3.1 Broadcast Resource Records

To support the Broadcast Resource Records (BRR), which are provided in the BDNS messages, a new resource record TYPE and CLASS are defined. The TYPE shall be defined to be BINFO, and the CLASS shall be defined to be BCAST. Table 5 describes the fields within the BINFO RDATA section of a Broadcast Resource Record.

TABLE 5

| BINFO RDATA | Description |
| --- | --- |
| Subrecord_count | A value specifying the number of subrecords encapsulated in this message. |
| For (i=0; i<Subrecord_count; i++) { | |
| Subrecord_body_size | A value indicating the size, in bytes, of the next subrecord_body that follows in this message. |
| Subrecord_type | A value indicating the type of the following broadcast resource record subrecord. The following are examples of subrecord types: Source ID (SRC_ID), Virtual Channel (VC), Service Number (SVN), Internet address (A), Broadcast Internet address (BA), Broadcast Directory or a File System (FS), Alias (ALIAS), Frequency (HZ), and Descriptor (DSCRPT). |
| Subrecord_body } | A BRR Subrecord. |

The subrecord types of Table 5 are described as follows:

SRC_ID—A subrecord representing the source identifier value representing the broadcast programming source associated with the domain name specified in this BRR.

VC—A subrecord representing the virtual channel identifier representing the broadcast Virtual Channel associated with the domain name specified in this BRR.

SVN—A subrecord representing the service number identifier representing the broadcast service number within a multiplex associated with the domain name specified in this BRR.

A—A subrecord representing the IP address of a remote host associated with the domain name specified in this BRR. Connections to the remote host can be established via Data-Over-Cable Service Interface Specifications (DOCSIS), Motorola ALOHA Medium Access Control (MAC), phone modem, wireless, or any other two-way communication mechanism that a terminal may support.

BA—A subrecord representing the IP address of a broadcast or multicast IP connection associated with the domain name specified in this BRR. This field is primarily intended to be used in support of broadcast ATVEF data connections.

FS—A subrecord representing the type of broadcast directory or file system associated with the domain name specified in this BRR.

ALIAS—A variable length domain name specifying an alias for the domain name given in this BRR.

DSCRPT—A subrecord representing a descriptor structure conforming to the generic "tag, length, data" format, described by the MPEG2-Systems document that is associated with the domain name specified in this BRR.

3.2 Broadcast Domain Name Table

In a specific embodiment, a Broadcast Domain Name Table (BDNT) may be used to broadcast DNS messages containing BRRs.

| BDNT | Description |
| --- | --- |
| Number_of_messages | A value specifying the number of BDNS messages that follow in this table. |
| Identifier | A value uniquely identifying this table. |

-continued

| BDNT | Description |
|---|---|
| Activation_time | A value specifying the time which the given BDNS_messages that follow in this table are valid. |
| For (i=0; i<Number_of_messages; i++) { | |
| BDNS_message | A DNS style message that may contain BRRs |
| } | |

3.3 Broadcast Domain Name Scenario

The following sections describe a simple scenario illustrating how BDNS might be used within a broadcast digital video environment.

Figure 5:
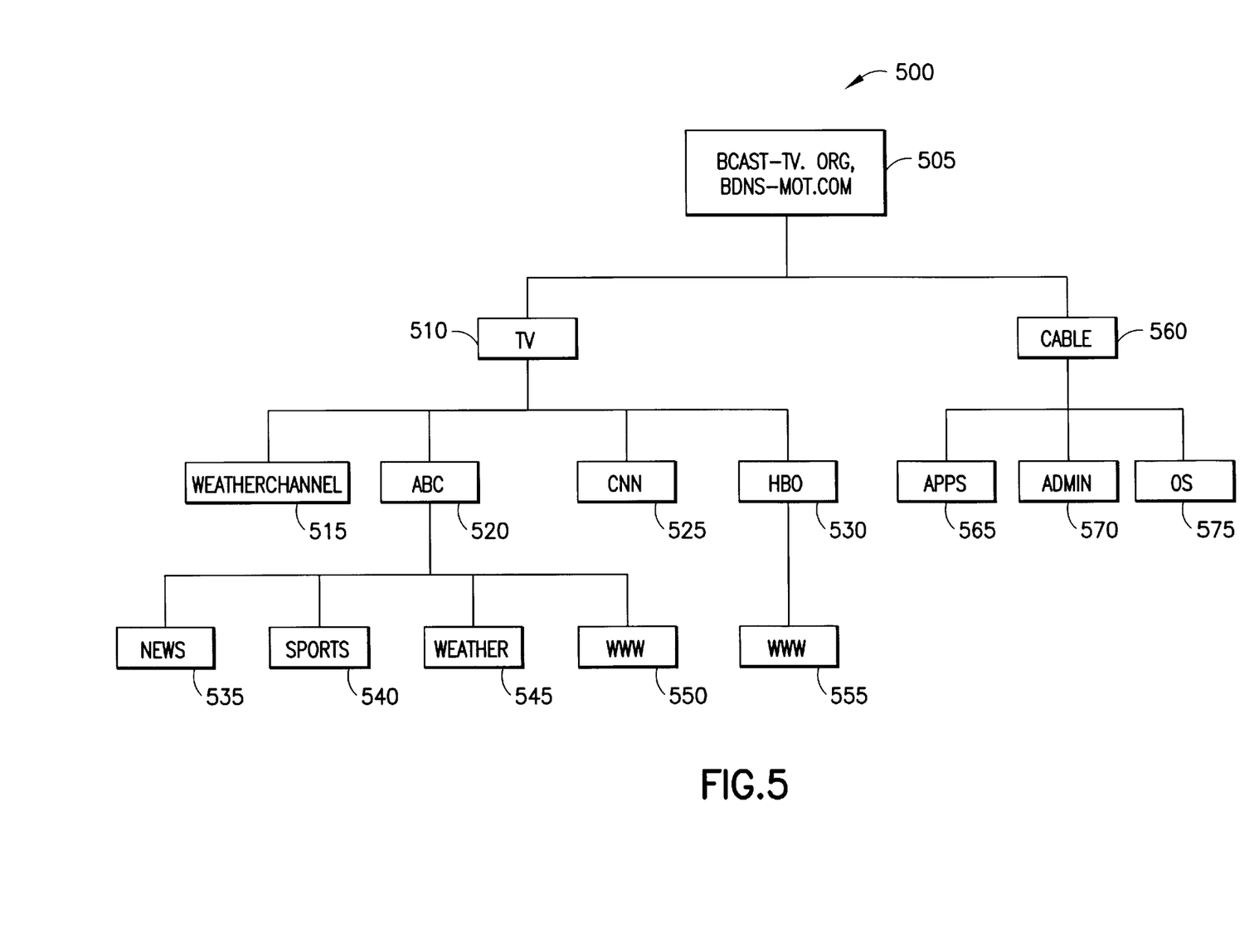
FIG. 5 illustrates an example broadcast domain name space in accordance with the present invention.

FIG. 5 illustrates an example broadcast domain name space in accordance with the present invention. The broadcast domain name space 500 has a tree structure, where BCAST-TV.ORG, BDNS-MOT.COM are the name servers that are authoritative for the "root" broadcast domain. The TV domain 510 and the CABLE. domain 560 are example top level domains. Other, conventional Internet and broadcast top level domains, such as COM, ORG, EDU, NET, GOV, MIL, FM, AM and so forth can also be provided in the broadcast domain name space. WEATHERCHANNEL 515, ABC 520, CNN 525 and HBO 530 are domains under TV 510. NEWS 535, SPORTS 540, WEATHER 545 and WWW 550 are domains under ABC 520, and WWW 555 is a domain under HBO 530. Additionally, APPS 565, ADMIN 570 and OS 575 are domains under CABLE 560. The same domain name label can be used in different branches of the domain name space 500.

The root of the BCAST domain class in this case is maintained by a modified Internet DNS name server, e.g., BCAST-TV.ORG. In addition, the example Internet name server BDNS-MOT.COM maintains the BCAST root information for redundancy.

The example domain name space 500 is organized into television-related domain names, under TV 510, and cable-related domain names, under CABLE 560. The television-related domain names in the example include names for specific television programming services, such as the popular channels represented by the trade name domain labels 515–530. Moreover, some of the programming services offer additional resources that the viewer can access under additional domain name labels 535–555. For example, a viewer may access specific video and audio programming services and web site content via the services available at WWW.ABC.TV which, in the example, is represented by labels 550, 520, and 510.

Within the cable-related domain names, a user. program or other software might access various data sources or services, such as applications (APPS 565), administrative services (ADMIN 570) and operating system downloads (OS 575). The applications may include an on-screen program guide, or interactive games, shop or bank at home functions, and the like. The administrative functions may be used by a network operator, such as at a headend, to maintain subscriber account information, including authorization of appropriate service tiers based on fees charged, and so forth. The operating system downloads also may be used by a headend operator, e.g., to maintain computer. equipment in the network.

CABLE 560 is just an example domain. The sub domains might be used to organize a system where applications, operating systems, or other administrative information such as virtual channel tables, etc. may be found.

Each domain name is determined by taking a lower level domain and working upwards to a higher level domain. For example, an example master file (resource record) syntax for the ADMIN.CABLE domain 570 is discussed below.

3.3.1 ADMIN.CABLE domain

```
CABLE.   BCAST SOA BCAST-TV.ORG. ADMIN.BCAST-TV.ORG (
    870729 ;serial
    1800 ;refresh every 30 minutes
    300 ;retry every 5 minutes
    604800 ;expire after a week
    86400 ;minimum of a day
    )
  NS BCAST-TV.ORG.
  NS BDNS-MOT.COM.
ADMIN    BINFO SRC_ID 102
```

3.3.2 The "TV" Top Level Domain 210

As described previously, BDNS can be utilized for defining broadcast domain names. Thus a broadcast, or BCAST, root domain needs to be defined, from which top level broadcast domains can be defined. As an example, assuming that a BCAST root has been defined, the master file representation of a "TV" top level domain name might be:

```
TV. BCAST SOA BCAST-TV.ORG. HOSTMASTER.BCAST-TV.ORG.(
    870729 ;serial
    1800 ;refresh every 30 minutes
    300 ;retry every 5 minutes
    604800 ;expire after a week
    86400 ;minimum of a day
    )
  NS ADMIN.CABLE.
  NS BCAST-TV.ORG.
  NS BDNS-MOT.COM.
ABC.TV.    BINFO SRC_ID 1033
  NS ADMIN.CABLE.
NS ADMIN.ABC.COM.
NBC.TV.    BINFO SRC_ID 1004
  NS ADMIN.CABLE.
NS BDNS-MOT.COM.
CNN    BINFO SRC_ID 1240
  NS ADMIN.CABLE.
  NS AUTHORITY.CNN.COM.
  NS BDNS-MOT.COM.
HBO    BINFO SRC_ID 435
  NS ADMIN.CABLE.
  NS C.HBO.COM.
  NS BDNS-MOT.COM.
```

3.3.3 WWW.ABC.TV Example

An example master file for this domain is:

```
ABC. BCAST SOA BCAST-TV.ORG.
HOSTMASTER.BCAST-TV.ORG. (
    870729 ;serial
    1800 ;refresh every 30 minutes
    300 ;retry every 5 minutes
    604800 ;expire after a week
    86400 ;minimum of a day
    )
  NS ADMIN.CABLE.
  NS ADMIN.ABC.COM.
  WWW    BINFO BA 224.0.1.113
  NEWS.ABC    BINFO A 103.34.0.9
  SPORTS.ABC    BINFO ALIAS    WWW.ABCSPORTS.COM.
  WEATHER    BINFO ALIAS WEATHERCHANNEL.TV.
```

3.3.4 WWW.HBO.TV Example
An example master file for this domain is:

```
HBO. BCAST SOA ADMIN.CABLE. HOSTMASTER.
BCAST-TV.ORG.(
    870729 ;serial
    1800 ;refresh every 30 minutes
    300 ;retry every 5 minutes
    604800 ;expire after a week
    86400 ;minimum of a day
)
NS ADMIN.CABLE.
NS C.HBO.COM.
NS BDNS-MOT.COM.
WWW    BINFO FS GITV_FS HBO/WWW
```

Accordingly, it can be seen that the present invention provides a Broadcast Domain Name System (BDNS) for integrating Internet-type resources into a broadcast environment, such as a broadcast television environment. The invention provides domain names for broadcast services and system resources, e.g., for a network over which the broadcast services are delivered. The invention provides a framework for allowing amuser to access different broadcast services and features such audio, video and data, including Internet-type content such as web pages.

Although the invention has been described in connection with various specific embodiments, those skilled in the art will appreciate that numerous adaptations and modifications may be made thereto without departing from the spirit and scope of the invention as set forth in the claims.

For example, while the invention was discussed in connection with a cable or satellite television broadband communication networks, it will be appreciated that other networks such as radio broadcasts, local area networks (LANs), metropolitan area networks (MANs), wide area networks (WANs), internets, intranets, and the Internet, or combinations thereof, may be used.

What is claimed is:

1. A method for providing a broadcast domain name system, comprising the steps of:

providing at least one master file at a broadcast domain name server to define at least one node within a broadcast domain name space;

wherein the node is provided in an associated zone of, and corresponds to, a domain within the broadcast domain name space;

wherein the domain has an associated domain name;

using the master file to form a broadcast resource record that designates at least one attribute of the node; and transmitting a message comprising the broadcast resource record from the broadcast domain name server to a resolver to enable a user of the broadcast domain name system to resolve the domain name, said message being carried in a broadcast signal.

2. The method of claim 1, wherein:

a plurality of nodes are provided in the broadcast domain name space; and only one of the nodes represents a root node of the broadcast domain name space.

3. The method of claim 1, wherein:

a plurality of nodes are provided in the broadcast domain name space; and at least one of the nodes represents a boundary between the associated zone and a lower level sub-zone thereof.

4. The method of claim 1, wherein:

the associated zone is a sub-zone of a higher-level zone in the broadcast domain name space.

5. The method of claim 1, wherein:

the message is transmitted from the broadcast domain name server to the resolver on a predetermined schedule without input from the user.

6. The method of claim 1, wherein:

the message is transmitted from the broadcast domain name server to the resolver in response to a query from the resolver, which is responsive to a query from the user.

7. The method of claim 1, comprising the further step of:

utilizing at least one of a User Datagram Protocol Internet Protocol (UDP/IP), Transmission Control Protocol Internet Protocol (TCP/IP), Motion Picture Experts Group (MPEG) Protocol, and a Digicipher II (DCII) Protocol to transmit the message.

8. The method of claim 1, comprising the further step of:

utilizing at least one of a singlecast, multicast, or broadcast addressing scheme to transmit the message.

9. The method of claim 1, comprising the further steps of:

caching the broadcast resource record in the message that is transmitted by the broadcast domain name server in a cache associated with the resolver;

retrieving information from the cached broadcast resource record in response to a query from a user program associated with the user; and forwarding the retrieved information to the user program to resolve the domain name.

10. The method of claim 1, wherein:

a plurality of broadcast domain name servers are provided, each of which provides at least one of primary authoritative data, redundant authoritative data, and cached data for zones within the broadcast domain name space.

11. The method of claim 10, wherein:

at least two of the broadcast domain name servers are arranged in a chained manner.

12. The method of claim 1, wherein:

the node represents a top level domain within the broadcast domain name space.

13. The method of claim 12, wherein:

the top level domain comprises at least one of a TV, FM, AM, CABLE, COM, NET, ORG, EDU, GOV, and MIL domain.

14. The method of claim 1, wherein:

a plurality of nodes are provided in the broadcast domain name space; and only one of the nodes is a top node of the associated zone.

15. The method of claim 14, wherein:

at least one broadcast resource record associated with the top node specifies a start of authority for the associated zone.

16. The method of claim 14, wherein:

at least one broadcast resource record associated with the top node specifies redundant name servers that are authoritative for the associated zone.

17. The method of claim 1, wherein:

the attribute comprises at least one data source identifier that is associated with the node.

18. The method of claim 17, wherein:

the data source comprises at least one service.

19. The method of claim 18, wherein:
the at least one service is broadcast to an end user device that is associated with the user.

20. The method of claim 18, wherein:
the at least one service is requested by an end user device that is associated with the user via an interactive network.

21. The method of claim 18, wherein:
the at least one service comprises at least one of an audio, video, and data service.

22. The method of claim 17, wherein:
the data source is identified by an address.

23. The method of claim 22, wherein:
the address comprises at least one of an Internet Protocol address and a broadcast Internet Protocol address.

24. The method of claim 17, wherein:
the data source is identified by a source identifier.

25. The method of claim 17, wherein:
the data source is identified by a channel number.

26. The method of claim 17, wherein:
the data source is identified by a virtual channel number.

27. The method of claim 17, wherein:
the data source is identified by at least one of a broadcast directory and a broadcast file system.

28. The method of claim 17, wherein:
the data source is identified by at least one of a text name and a text alias.

29. The method of claim 17, wherein:
the data source is identified by an associated descriptor.

30. The method of claim 17, wherein:
the data source is identified by at least one of an associated frequency and a service number.

31. The method of claim 1, wherein:
the message is transmitted from the broadcast domain name server to the resolver across a network.

32. The method of claim 31, wherein:
the network comprises at least one of a broadband communication network, a cable network, a satellite network, a wireless network, an fiber optic network, a digital subscriber loop network, a local area network, a wide area network, and a metropolitan area network.

33. The method of claim 1, wherein:
the broadcast domain name server and the resolver reside on a single device.

34. The method of claim 33, wherein:
the message is transmitted from the broadcast domain name server to the resolver using at least one of a data queue, a pipe, a shared memory, a socket, a buffer, and a file.

35. The method of claim 1, wherein:
the user resolves the domain name via at least one of a client terminal and a server.

36. The method of claim 35, wherein:
the user resolves the domain name via a name server.

37. The method of claim 1, wherein:
the user resolves the domain name via a client terminal that comprises at least one of a subscriber terminal, a set-top box, and a personal computer.

38. A method for providing a broadcast domain name system, comprising the steps of:
receiving, at a resolver, a message comprising a broadcast resource record from a broadcast domain name server; and
resolving a domain name of a domain within a broadcast domain name space for a user of the broadcast domain name system in accordance with the received message;
wherein:
the broadcast resource record designates at least one attribute of a node within the broadcast domain-name space, and is formed using a master file at the broadcast domain name server;
the node is provided in an associated zone of, and corresponds to, the domain; and
the message is carried in a broadcast signal.

39. The method of claim 38, wherein:
the message is received from the broadcast domain name server at the resolver on a predetermined schedule without input from the user.

40. The method of claim 38, wherein:
the message is received from the broadcast domain name server at the resolver in response to a query from the resolver, which is responsive to a query from the user.

41. The method of claim 38, wherein:
the message is received at the resolver utilizing at least one of a User Datagram Protocol Internet Protocol (UDP/IP), Transmission Control Protocol Internet Protocol (TCP/IP), Motion Picture Experts Group (MPEG) Protocol, and a Digicipher II (DCII) Protocol to transmit the message.

42. The method of claim 38, wherein:
the message is received at the resolver utilizing at least one of a singlecast, multicast, or broadcast addressing scheme to transmit the message.

43. The method of claim 38, comprising the further steps of:
caching the broadcast resource record in the message that is received from the broadcast domain name server in a cache associated with the resolver;
retrieving information from the cached broadcast resource record in response to a query from a user program associated with the user; and
forwarding the retrieved information to the user program to resolve the domain name.

44. The method of claim 38, wherein:
the message is received from the broadcast domain name server at the resolver via a network.

45. The method of claim 44, wherein:
the network comprises at least one of a broadband communication network, a cable network, a satellite network, a wireless network, an fiber optic network, a digital subscriber loop network, a local area network, a wide area network, and a metropolitan area network.

46. The method of claim 38, wherein:
the broadcast domain name server and the resolver reside on a single device.

47. The method of claim 46, wherein:
the message is received from the broadcast domain name server at the resolver using at least one of a data queue, a pipe, a shared memory, a socket, a buffer, and a file.

48. An apparatus for providing a broadcast domain name system, comprising:
means for providing at least one master file at a broadcast domain name server to define at least one node within a broadcast domain name space;
wherein the node is provided in an associated zone of, and corresponds to, a domain within the broadcast domain name space;
wherein the domain has an associated domain name;

means for using the master file to form a broadcast resource record that designates at least one attribute of the node; and means for transmitting a message comprising the broadcast resource record from the broadcast domain name server to a resolver to enable a user of the broadcast domain name system to resolve the domain name, said message being carried in a broadcast signal.

49. An apparatus for providing a broadcast domain name system, comprising:

means for receiving, at a resolver, a message comprising a broadcast resource record from a broadcast domain name server; and means for resolving a domain name of a domain within a broadcast domain name space for a user of the broadcast domain name system in accordance with the received message; wherein:

the broadcast resource record designates at least one attribute of a node within the broadcast domain name space, and is formed using a master file at the broadcast domain name server;

the node is provided in an associated zone of, and corresponds to, the domain; and the message is carried in a broadcast signal.

* * * * *